US006535511B1

(12) United States Patent
Rao

(10) Patent No.: US 6,535,511 B1
(45) Date of Patent: Mar. 18, 2003

(54) METHOD AND SYSTEM FOR IDENTIFYING EMBEDDED ADDRESSING INFORMATION IN A PACKET FOR TRANSLATION BETWEEN DISPARATE ADDRESSING SYSTEMS

(75) Inventor: Satyanarayana B. Rao, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/227,044

(22) Filed: Jan. 7, 1999

(51) Int. Cl.$^7$ ................................................ H04L 12/56
(52) U.S. Cl. ...................................... 370/392; 370/401
(58) Field of Search .................................. 370/392, 389, 370/400, 401, 402; 709/203, 227, 245

(56) References Cited

U.S. PATENT DOCUMENTS

| | | |
|---|---|---|
| 4,771,425 A | 9/1988 | Baran et al. |
| 4,819,228 A | 4/1989 | Baran et al. |
| 4,903,261 A | 2/1990 | Baran et al. |
| 4,975,906 A | 12/1990 | Takiyasu et al. |
| 4,985,889 A | 1/1991 | Frankish et al. |
| 5,020,058 A | 5/1991 | Holden et al. |
| 5,059,925 A | 10/1991 | Weisbloom |
| 5,072,449 A | 12/1991 | Enns et al. |
| 5,088,032 A | 2/1992 | Bosack |
| 5,115,431 A | 5/1992 | Williams et al. |
| 5,119,403 A | 6/1992 | Krishnan |
| 5,128,945 A | 7/1992 | Enns et al. |
| 5,224,099 A | 6/1993 | Corbalis et al. |
| 5,255,291 A | 10/1993 | Holden et al. |
| 5,274,631 A | 12/1993 | Bhardwaj |
| 5,274,635 A | 12/1993 | Rahman et al. |
| 5,274,643 A | 12/1993 | Fisk |
| 5,313,454 A | 5/1994 | Bustini et al. |
| 5,317,562 A | 5/1994 | Nardin et al. |
| 5,359,592 A | 10/1994 | Corbalis et al. |
| 5,394,394 A | 2/1995 | Crowther et al. |
| 5,422,880 A | 6/1995 | Heitkamp et al. |
| 5,430,715 A | 7/1995 | Corbalis et al. |
| 5,434,863 A | 7/1995 | Onishi et al. |
| 5,452,306 A | 9/1995 | Turudic et al. |
| 5,461,624 A | 10/1995 | Mazzola |
| 5,473,599 A | 12/1995 | Li et al. |
| 5,473,607 A | 12/1995 | Hausman et al. |
| 5,509,006 A | 4/1996 | Wilford et al. |
| 5,517,488 A | 5/1996 | Miyazaki et al. |
| 5,519,704 A | 5/1996 | Farinacci et al. |
| 5,555,244 A | 9/1996 | Gupta et al. |
| 5,561,663 A | 10/1996 | Klausmeier |

(List continued on next page.)

FOREIGN PATENT DOCUMENTS

| | | |
|---|---|---|
| EP | 0677941 | 10/1995 |
| WO | WO 95/20282 | 7/1995 |
| WO | WO 96/04729 | 2/1996 |

OTHER PUBLICATIONS

"Utopia Specification Level 1, Version 2.01," (af–phy–0017.000), *The ATM Forum Committee*, Mar. 21, 1994, 19 pages. Dated Mar. 21, 1994.

Anthony Alles, "ATM Internetworking," *Cisco Systems, Inc.*, May 1995, 59 pages. Dated May 1995.

"Utopia Level 2, Version 1.0," (af–phy–0039.000), *The ATM Forum Committee*, Jun. 1995, 69 pages. Dated Jun. 1995.

*Primary Examiner*—Chau Nguyen
*Assistant Examiner*—Soon-Dong Hyun
(74) *Attorney, Agent, or Firm*—Baker Botts L.L.P.

(57) ABSTRACT

Embedded addressing information is identified in a packet by providing a database including a plurality of records. Each record is operable to identify a packet having embedded addressing information and the embedded addressing information in the packet. Packets are compared to the database records to determine whether the packets include embedded addressing information. In response to determining that a packet includes embedded addressing information, the embedded addressing information is identified in the packet for translation between disparate addressing systems.

20 Claims, 2 Drawing Sheets

U.S. PATENT DOCUMENTS

| | | |
|---|---|---|
| 5,561,669 A | 10/1996 | Lenney et al. |
| 5,570,360 A | 10/1996 | Klausmeier et al. |
| 5,583,862 A | 12/1996 | Callon |
| 5,598,581 A | 1/1997 | Daines et al. |
| 5,604,741 A | 2/1997 | Samueli et al. |
| 5,612,957 A | 3/1997 | Gregerson et al. |
| 5,617,417 A | 4/1997 | Sathe et al. |
| 5,617,421 A | 4/1997 | Chin et al. |
| 5,666,353 A | 9/1997 | Klausmeier et al. |
| 5,673,265 A | 9/1997 | Gupta et al. |
| 5,691,997 A | 11/1997 | Lackey, Jr. |
| 5,729,546 A | 3/1998 | Gupta et al. |
| 5,732,079 A | 3/1998 | Castrigno |
| 5,737,526 A | 4/1998 | Periasamy et al. |
| 5,737,635 A | 4/1998 | Daines et al. |
| 5,740,171 A | 4/1998 | Mazzola et al. |
| 5,740,176 A | 4/1998 | Gupta et al. |
| 5,742,604 A | 4/1998 | Edsall et al. |
| 5,742,649 A | 4/1998 | Muntz et al. |
| 5,764,636 A | 6/1998 | Edsall |
| 5,764,641 A | 6/1998 | Lin |
| 5,765,032 A | 6/1998 | Valizadeh |
| 5,787,070 A | 7/1998 | Gupta et al. |
| 5,787,255 A | 7/1998 | Parlan et al. |
| 5,793,763 A | 8/1998 | Mayes et al. |
| 5,793,978 A | 8/1998 | Fowler |
| 5,796,732 A | 8/1998 | Mazzola et al. |
| 5,802,042 A | 9/1998 | Natarajan et al. |
| 5,805,595 A | 9/1998 | Sharper et al. |
| 5,812,618 A | 9/1998 | Muntz et al. |
| 5,822,383 A | 10/1998 | Muntz et al. |
| 5,835,036 A | 11/1998 | Takefman |
| 5,835,481 A | 11/1998 | Akyol et al. |
| 5,835,494 A | 11/1998 | Hughes et al. |
| 5,835,725 A | 11/1998 | Chiang et al. |
| 5,838,915 A | 11/1998 | Klausmeier et al. |
| 5,838,994 A | 11/1998 | Valizadeh |
| 5,859,550 A | 1/1999 | Brandt |
| 5,864,542 A | 1/1999 | Gupta et al. |
| 5,867,666 A | 2/1999 | Harvey |
| 6,038,233 A * | 3/2000 | Hamamoto et al. ......... 370/401 |
| 6,058,431 A * | 5/2000 | Srisuresh et al. ........... 709/225 |
| 6,119,171 A * | 9/2000 | Alkhatib .................... 370/390 |
| 6,128,664 A * | 10/2000 | Yanagidate et al. ......... 370/389 |
| 6,205,489 B1 * | 3/2001 | Kapoor ....................... 709/245 |
| 6,353,614 B1 * | 3/2002 | Borella et al. .............. 370/389 |

* cited by examiner

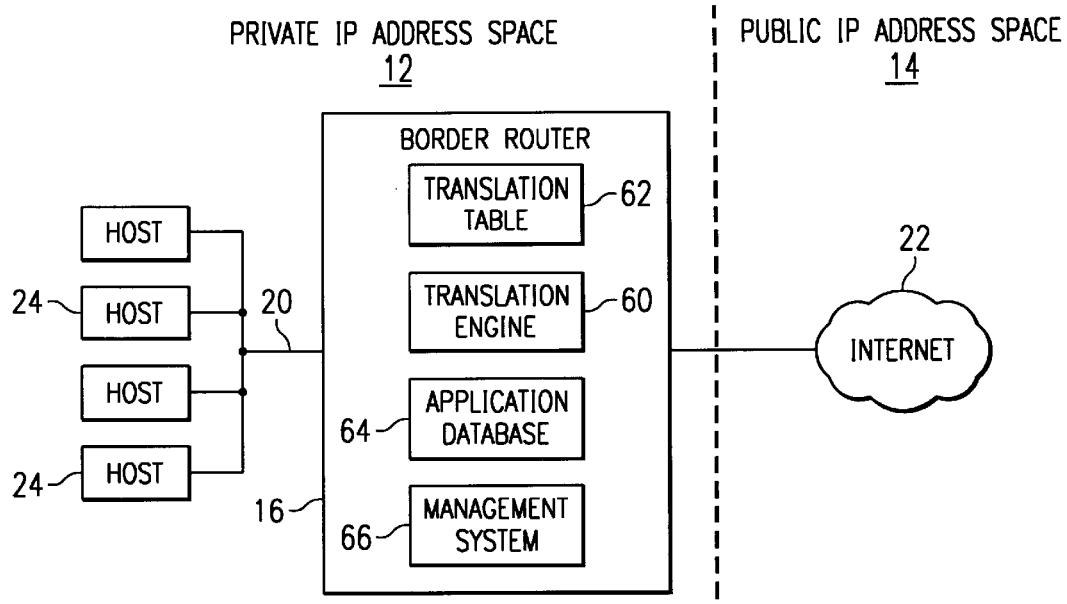
*FIG. 1*
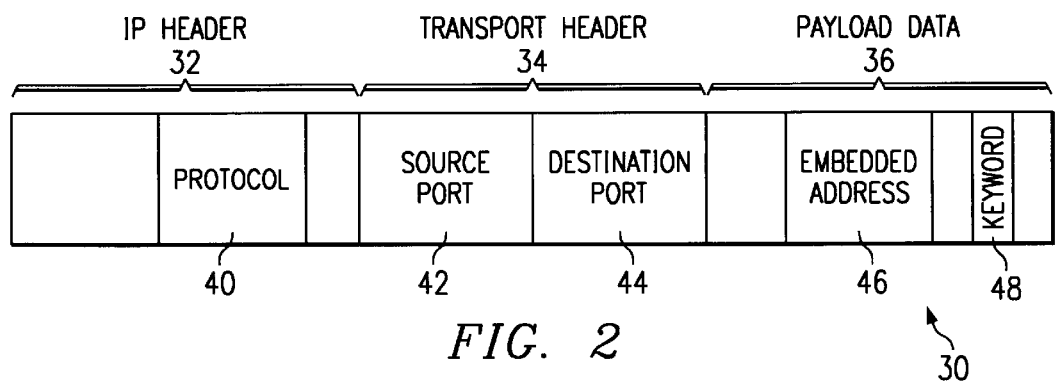
*FIG. 2*
*FIG. 3*

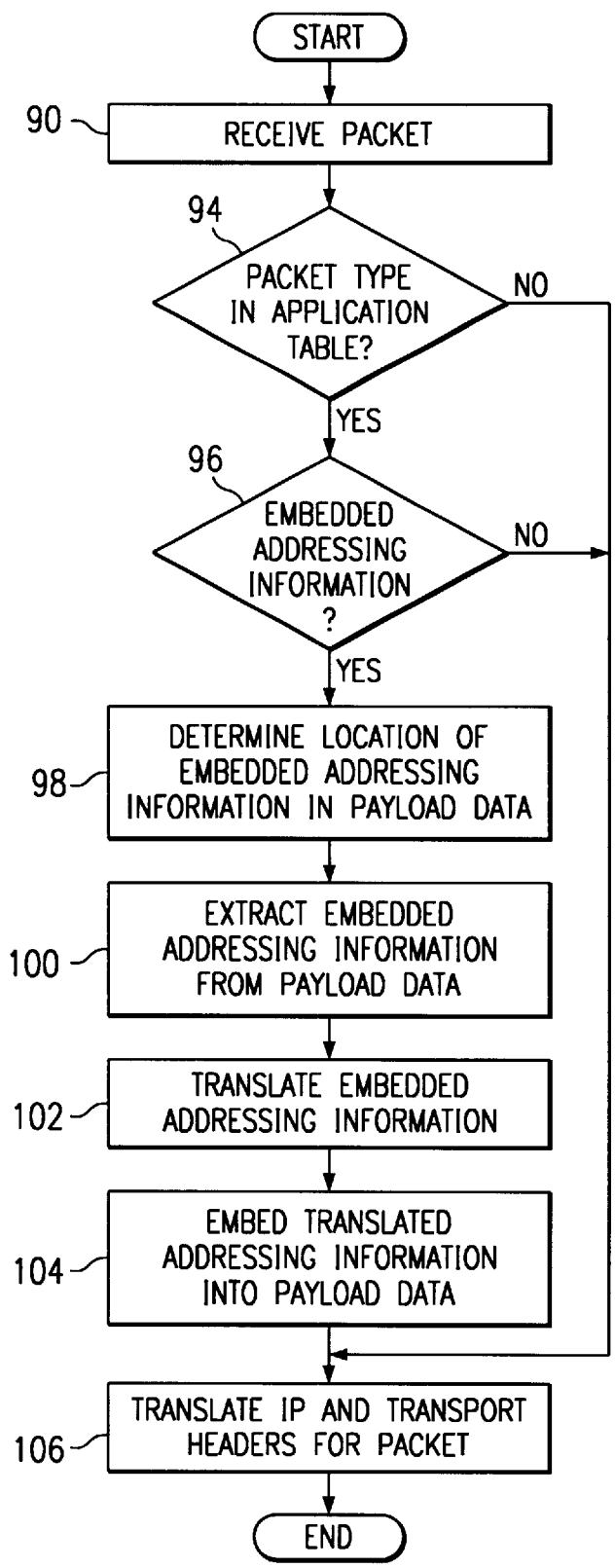

METHOD AND SYSTEM FOR IDENTIFYING EMBEDDED ADDRESSING INFORMATION IN A PACKET FOR TRANSLATION BETWEEN DISPARATE ADDRESSING SYSTEMS

TECHNICAL FIELD OF THE INVENTION

This invention relates generally to the field of network addressing, and more particularly to a method and system for identifying embedded addressing information in a packet for translation between disparate addressing systems.

BACKGROUND OF THE INVENTION

Due to the success of the Internet, the Internet Protocol (IP) has become the primary networking protocol. Major concerns of the Internet community are the depletion of global IP address space (IPV4) and the complexity of configuring hosts with global IP addresses for Internet access. To extend the life of current IP address space and provide configureless access, network address translation (NAT) and its extension port address translation (PAT) have been employed.

Network address translation supports connectivity between the Internet and hosts using private addressing schemes. This connectivity provides configureless access to the Internet in that hosts may have independently assigned, globally non-unique addresses that need not be coordinated with the Internet Address Numbering Association (IANA) or other Internet registry. Network address translation pairs up the private addresses to public addresses so that the inside IP addresses appear as legally registered IP addresses on the Internet.

Port address translation allows a number of private network addresses and their ports to be translated to a single network address and its ports. Thus, multiple hosts in a private network may simultaneously access the Internet using a single legally registered IP address. The registered IP address is typically assigned to a router that translates addressing information contained in message headers between the addressing schemes.

A problem with Network and Port Address Translation is that some applications embed addressing information in their message payload data. This embedded addressing information is also to be translated when the packet is crossing the boundary. Unfortunately the translation function does not have the knowledge of the application packet format nor does it know if the packet has embedded addressing information. Therefor it is not possible for the translation function in the border routers to translate such data packets without specific knowledge of such applications and their packet formats. The mechanism to translate such packets is to be implemented in the translation function. Translation functions fail as soon as a new such application is developed or used with the router. Normally vendors of such translation functions in the routers develop new versions to handle the newly discovered applications that embed addressing information in their packets and make new release of the software and update all the affected installed systems. This is time consuming, expensive and cumbersome besides user application downtime.

SUMMARY OF THE INVENTION

The present invention provides a method and system for identifying embedded addressing information in a packet that substantially eliminate or reduce disadvantages and problems associated with previously developed systems and methods. In particular, the present invention uses readily updatable database records to identify embedded addressing information for translation between disparate addressing systems.

In accordance with one embodiment of the present invention, embedded addressing information is identified in a packet by providing a database including a plurality of records. Each record is operable to identify a packet having embedded addressing information and the embedded addressing information in the packet. Packets are compared to the database records to determine whether the packets include embedded addressing information. In response to determining that a packet includes embedded addressing information, the embedded addressing information is identified in the packet for translation between disparate addressing systems.

More particularly, in accordance with a particular embodiment of the present invention, each record includes a packet genus identifying a packet type capable of including embedded addressing information, a packet species identifying packets of the type that include embedded addressing information, and a locator identifying the embedded addressing information in the packets. In this embodiment, the packet genus may identify a protocol and a port for the packet type. A packet species may identify a term used in connection with embedded addressing information in the packet type. The locator may identify an offset to the embedded addressing information from a known location in the packet.

Technical advantages of the present invention include providing a method and system for identifying embedded addressing information in a packet for translation between disparate addressing systems. In particular, embedded addressing information is identified in packets using a configurable database that can be inexpensively updated using user interface (UI) commands. As a result, new applications are supported without changes in router software. Thus, costs associated with software upgrades to a network address translation system and with application downtime due to network address translation failure as a result of deployment of a new application having embedded addressing information, are reduced. In addition, database updates do not significantly increase system resource use and therefore do not degrade translation performance such as when customized software is added for each application having embedded addressing information.

Other technical advantageous will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 1 is a block diagram illustrating a router for translating addressing information between private and public address spaces in accordance with one embodiment of the present invention;

FIG. 2 illustrates details of a packet in accordance with one embodiment of the present invention;

FIG. 3 illustrates details of the application table of FIG. 1 in accordance with one embodiment of the present invention; and FIG. 4 is a flow diagram illustrating a computer method for identifying and translating embedded addressing information in a packet in accordance with one embodiment of the present invention.

DETAILED DESCRIPTION OF THE INVENTION

FIG. 1 is a block diagram illustrating a private addressing space 12, a public addressing space 14, and a border router 16 disposed between the private and public address spaces 12 and 14 for translating addresses between the spaces. For the embodiment of FIG. 1, the private address space 12 is an Intranet 20 and the public address space 14 is the Internet 22. It will be understood that the private and public address spaces 12 and 14 may be other suitable types of networks using disparate addressing systems.

The Intranet 20 includes an inside network connecting a plurality of remote hosts 24 to the router 16. The inside network is a local area network (LAN), a wide area network (WAN), or the suitable type of link capable of communicating data between the hosts 24 and the router 16. For the local area network embodiment, the inside network may be an Ethernet. The Internet 22 can be other types of outside networks such as a local area network (LAN) or public Internet which employs the outside addressing scheme. Translation function translates network address information between these two schemes whenever packets cross the boundary which is router 16.

The hosts 24 are each a computer such as a personal computer, file server, workstation, minicomputer, mainframe, or any general purpose or other computer or device capable of communicating with other computers or devices over a network. In the personal computer embodiment, the hosts 24 may each include input devices, output devices, processors, and memory. The input devices may include a pointing device such as a mouse, keyboard, or the like. The output devices may include a monitor, a printer, or the like.

In a particular embodiment, the hosts 24 are each assigned a private Internet Protocol (IP) address for communication within the Intranet 20. The router 16 is assigned a public Internet Protocol (IP) address and uses port address translation (PAT) to translate the private IP addresses to the public IP address for communication on the Internet 22. It will be understood that other suitable types of addressing protocols and translation may be used in and between the private and public addressing spaces 12 and 14.

FIG. 2 illustrates details of an IP packet 30 for transmitting messages over and between the Intranet 20 and Internet 22. The packet 30 includes an IP header 32 and a transport protocol header 34, and a payload data 36. The IP and the transport protocol headers 32 and 34 together provide the addressing information that uniquely identifies the source and destination of the packet. This addressing information is added as overhead data to the payload data 36 (for every packet) by the TCP/IP protocol layers for transmission and forwarding in a network.

Referring to FIG. 2, the IP header 32 includes protocol data 40 identifying the packet protocol. The transport header 34 includes source port data 42 and destination port data 44. The source port 42 identifies the port transmitting the packet 30. The destination port 44 identifies the port to which the packet 30 is destined.

The payload data 36 comprises data generated by an application for transmission to and use by a remote application. Such data may be requesting information from or supplying information to the remote application. Payload data 36 generated by some applications may include embedded addressing information 46. Addressing information is often embedded in the payload data 36 by an application to initialize or set up a communications session with another application. The payload data 36 may also include a keyword 48 indicating the existence of application specific embedded addressing information in the payload data 36.

As described in more detail below, the protocol and port data 40, 42 and/or 44 function as a packet genus operable to identify a packet type capable of including the embedded addressing information 46. The keyword 48 functions as a packet species operable to identify packets of the type that actually include the embedded addressing information 46. In this way, embedded addressing information 46 may be identified for translation between the private and public IP addresses. It will be understood that other suitable types of information within a packet may be used to identify embedded addressing information for translation.

Returning to FIG. 1, the router 16 includes computer software and data that is loaded into system memory and executed by one or more processes. The computer software and data are generally identified by tables, engines, systems, files and the like. It will be understood that the computer software and data may be otherwise combined and/or divided for processing in or remotely from the router 16 and otherwise stored in system or other suitable memory in or remotely from the router 16 without departing from the scope of the present invention. Accordingly, the labels of the table, engine, database, and system are for illustrative purposes and may be suitably varied. The router 16 may be a Cisco 675 router manufactured by Cisco Systems, Inc. or other suitable border router or device capable of translating addresses between disparate addressing systems.

The router 16 includes a translation engine 60, a translation table 62, an application database 64, and a management system 66. The translation engine 60 uses the translation table 62 to translate addresses between the private and public address spaces 12 and 14. In the IP embodiment, the translation engine 60 performs port address translation (PAT). Port address translation automatically establishes binding between the private IP addresses and the public IP address dynamically during initiation of a session. Port address translation makes use of the protocol and port data 40, 42 and/or 44 in the packet 30 to translate the larger number of private IP addresses to the smaller number of public IP addresses. Further information concerning port address translation may be obtained from RFC 1631 and RFC 1918, published by the Internet Engineering Task Force (IETF), which are hereby incorporated by reference.

The application database 64 is used by the translation engine 60 to determine whether packets received by the router 16 included embedded addressing information 46 and to identify included embedded addressing information for translation. The application database 64 may be a database table or any other suitable structure capable of storing information with which the embedded addressing information 46 may be identified.

FIG. 3 illustrates details of the application database 64 in accordance with one embodiment of the present invention. In this embodiment, the application database 64 is a table 68 configured to identify application specific embedded addressing information in IP packets 30. It will be understood that other information may be used to identify embedded addressing information in IP and other types of packets 30.

Referring to FIG. 3, the application table 68 includes a plurality of records 70 each operable to identify a packet 30 having embedded addressing information 46 and the embedded addressing information 46 in the packet 30. As used herein, each means each of at least a subset of the identified items. Each record 70 includes an application field 72 identifying the application to which the record 70 corresponds, a protocol field 74 specifying a packet protocol, a port field 76 specifying a port for the protocol, one or more keyword fields 78 specifying a term or terms indicating the existence of embedded addressing information 46 in a packet having the specified protocol and port, one or more offset fields 80 specifying offsets to the embedded addressing information 46 in the packet, and a transmit direction field 82 specified whether the record 70 is for inbound or outbound traffic.

The protocol and port fields 74 and 76 together form a packet genus with which a packet type capable of including embedded addressing information 46 may be identified. The keyword field 78 forms a packet species indicative of the existence of the embedded addressing information 46 in the packet 30. It is possible to specify multiple keywords and various logical combinations in which they can be used to uniquely identify a packet that contains embedded addressing information. The offset 80 indicates the location of the embedded addressing information 46. An offset 80 is provided for each item of embedded addressing information 48 within the payload data 36 of a packet 30. The offset 80 is used to identify and extract embedded addressing information 48 and may be from the beginning of the payload data 36 or any other known location in or associated with the packet 30.

Returning to FIG. 1 the management system 66 manages and updates the router 16. The management system 66 may be locally or remotely accessed to update the application table 68 using user interface (UI) commands. Accordingly, in response to deployment of a new application on a host 20 that embeds addressing information, the application table 68 may be promptly updated to include an entry 70 that is operable to identify embedded addressing information within packets generated in connection with that new application. Accordingly, delays and failures are minimized.

FIG. 4 is a flow diagram illustrating a computer method for identifying translating embedded addressing information 46 in a packet 30 in accordance with one embodiment of the present invention. In this embodiment, IP packets 30 are translating using port address translation. It will be understood that the method of the present invention may be used in connection with other suitable types of addressing and translation systems.

Referring to FIG. 4, the method begins at step 90 in which a packet 30 is received at the router 16. Generally described, translation happens from upper layers down i.e. application payload translation happens first and then transport protocol header and then IP protocol header will be translated. This is because, modifications to the payload data due to address information translation can result in changes to the transport protocol header and IP protocol header.

Proceeding to decisional step 94, the translation engine 60 compares the protocol and port data 40, 42, and/or 44 of the received packet 30 to the protocol and port fields 74 and 76 in the application table 68 to determine whether the packet 30 is of a type capable of including embedded addressing information 46. If the protocol and port data 40, 42 and/or 44 for the packet 30 are not listed in the application table 68, then the packet 30 is determined not to be capable of including embedded addressing information 46 and the No branch of decisional step 94 and leads to step 106, which is described in more detail below. However, if the protocol and port data 40, 42 and/or 44 for the packet 30 are listed in the application table 68, the packet 30 is of a type capable of including embedded addressing information 46 and the Yes branch of decisional step 94 leads to decisional step 96.

At decisional step 96, the translation engine 60 compares the payload data 36 to terms specified by the keyword entries 78 for records 70 matching the protocol and port 40, 42 and/or 44 to determine if the packet 30 actually includes embedded addressing information 46. If the packet 30 does not include a term matching a keyword entry 78 or terms matching a logical set of keywords, it is determined that the packet 30 does not include embedded addressing information 46 and the No branch of decisional step 96 leads to step 106. However, if the packet 30 includes a term matching a keyword entry 78 or terms matching a logical set of keywords, the packet 30 has embedded addressing information 46 and the Yes branch of decisional step 96 leads to step 98.

At step 98, the translation engine 60 determines the location of the embedded addressing information 46 using one or more offsets 80 specified by the matching record 70. Next, at step 100, the translation engine 60 extracts the embedded addressing information 46 from the payload data 36 of the packet 30. The embedded address information 46 is translated at step 102 by the translation engine 46. The translation is done in accordance with standard port address translation used to translate the IP addresses in the headers 32 and 34 or other suitable translation techniques.

Proceeding to step 104, the translated addressing information is embedded into the payload data 36 in place of the extracted information. In addition, a check sum is recomputed. In this way, embedded addressing information is identified for translation using a readily updatable database. As a result, costs associated with software upgrades to a network address translation system and with application downtime due to network address translation failure as a result of deployment of a new application having embedded addressing information, are reduced. In addition, the database updates do not significantly increase system resource use and therefore do not degrade translation performance.

Next, at step 106, the translation engine 60 translates the IP and transport headers 32 and 34 for the packet 30 using port address translation. In translating the headers 32 and 34, port address translation also recomputes the check sum for the packet 30. Step 106 leads to the end of the process at which point addressing information in the packet has been translated.

Although the present invention has been described with several embodiments, various changes and modifications may be suggested to one skilled in the art. It is intended that the present invention encompass such changes and modifications as fall within the scope of the appended claims.

What is claimed is:

1. A method for identifying embedded addressing information in a packet payload of a packet for translation between disparate addressing systems, comprising:

providing a database including a plurality of records each operable to identify a packet having embedded addressing information and the embedded addressing information in the packet;

comparing at least a portion of the packets, including the packet payloads, to the records in the database to determine whether the packets include embedded addressing information; and in response to determining a packet includes embedded addressing information, identifying the embedded addressing information in the packet.

2. The method of claim 1, wherein each record includes a packet genus identifying a packet type capable of including embedded addressing information and a packet species identifying packets of the type that include embedded addressing information.

3. The method of claim 2, wherein the packet genus identifies a protocol for the packet type.

4. The method of claim 2, wherein the packet genus identifies a port for the packet type.

5. The method of claim 2, wherein the packet genus identifies a protocol and a port for the packet type.

6. The method of claim 2, wherein the packet species identifies a term used in connection with embedded addressing information in the packet type.

7. The method of claim 2, wherein each record includes a locator identifying the embedded addressing information in the packet.

8. The method of claim 7, wherein the locator identifies an offset to the embedded addressing information from a known location of the packet.

9. The method of claim 1, wherein the records are stored within a table in the database.

10. The method of claim 1, wherein the database is provided at a translation point and each packet received at the translation point is compared to the records in the database to determine whether the packet includes embedded addressing information.

11. The method of claim 1, further comprising permitting identification of embedded addressing information in a new packet by updating the database to include a new record operable to identify the new packet.

12. The method of claim 1, wherein the database is updated to include the new record by user interface (UI) commands.

13. A method for translating embedded addressing information between disparate addressing systems, comprising:

providing a database including a plurality of records each operable to identify a packet having embedded addressing information and the embedded addressing information in the packet;

comparing at least a portion of a packet, including a packet payload of the packet, to the records in the database to determine whether the packet includes embedded addressing information;

in response to determining the packet includes embedded addressing information, translating the embedded addressing information to generate translated addressing information; and replacing the embedded addressing information in the packet with the translated addressing information.

14. The method of claim 13, wherein each record includes a packet genus identifying a packet type capable of including embedded addressing information, a packet species identifying packets of the type that include embedded addressing information, and a locator identifying the embedded addressing information in the packets.

15. The method of claim 14, wherein the packet genus identifies a protocol and a port for the packet type, the packet species identifies a term used in connection with embedded addressing information in the packet type, and the locator identifies an offset to the embedded addressing information from a known location in the packet.

16. The method of claim 13, the act of translating the embedded addressing information comprising translating an Internet Protocol (IP) address between a private network addressing system and a public network addressing system.

17. A system for translating embedded addressing information between disparate addressing systems, comprising:

a database including a plurality of records each operable to identify a packet having embedded addressing information and the embedded addressing information in the packet; and a translation engine operable to compare at least a portion of a packet, including a packet payload of the packet, to the records in the database to determine whether the packet includes embedded addressing information, to identify embedded addressing information in a packet in response to determining that the packet includes embedded addressing information, to translate the identified embedded addressing information, and to replace the identified embedded addressing information in the packet with the translated addressing information.

18. The system of claim 17, wherein each record includes a packet genus identifying a packet type capable of including embedded addressing information, a packet species identifying packets of the type that include embedded addressing information, and a locator identifying the embedded addressing information in the packets.

19. The system of claim 18, wherein the packet genus identifies a protocol and a port for the packet type, the packet species identifies a term used in connection with embedded addressing information in the packet type, and the locator identifies an offset to the embedded addressing information from a known location in the packet.

20. The system of claim 17, wherein the system is a router.

* * * * *